United States Patent Office 3,325,451
Patented June 13, 1967

3,325,451
PROCESS FOR INCREASING MOLECULAR
WEIGHT OF POLYPHENYLENE ETHERS
Harry S. Blanchard, Phoenixville, Pa., assignor to General
Electric Company, a corporation of New York
No Drawing. Filed Jan. 7, 1965, Ser. No. 424,111
6 Claims. (Cl. 260—47)

This invention relates to a process of increasing the molecular weight of polymers of 2,6-dimethylphenol which are poly-(2,6-dimethyl-1,4-phenylene) ethers. More particularly, this invention relates to a process of increasing the molecular weight of such polymers by reacting oxygen with an emulsion comprising a solution of said polymer and a solution of an alkali metal hydroxide which is immiscible with the solution of the polymer.

Polyphenylene ethers in which the oxygen joins the phenylene units through the 1 and 4 positions have recently become very important polymers. They are generally prepared by reacting a phenol with oxygen in the presence of a copper complex with amines. Such products and the process of preparing them are disclosed, for example, by Hay in his copending applications, Ser. Nos. 212,127 and 212,128, both filed July 24, 1962, now U.S. Patents 3,306,874 and 3,306,875, respectively, and assigned to the same assignee as the present invention. Staffin and Price in J. Am. Chem. Soc. 82, 3632–3634 (1960), disclose a method of making low molecular weight polymers from 2,6-dimethyl-4 bromophenol, using various oxidizing reagents such as alkaline potassium ferricyanide, lead dioxide, iodine, etc. The latter are too brittle to be used to produce flexible films or fibers. It would be highly desirable that such low molecular weight polymers could be converted to higher molecular weight products having an intrinsic viscosity of at least 0.4. These high molecular weight polymers are capable of forming strong, flexible films and fibers. Hay discloses in his above-identified applications that low molecular weight polymers can be converted to high molecular weight polymers by reacting the low molecular weight polymers with oxygen in the presence of the same catalyst used in oxidizing the various phenols to polymers. Because of the cost of the copper salt and the amine in forming the catalyst system, it would be highly desirable to have a more economical process of converting low molecular weight polymers to high molecular weight polymers. Unexpectedly I have discovered that low molecular weight polymers of 2,6-dimethylphenol may be converted to high molecular weight polymers by reacting oxygen with an emulsion in which the solution of the polymer forms one phase and solution of an alkali metal hydroxide forms the other phase. Such a process will not convert 2,6-dimethylphenol itself to a polymer, but surprisingly enough will convert 4-(2′,6′-dimethylphenoxy)-2,6-dimethylphenol, the dimer and the lowest molecular weight phenylene ether polymer of this phenol, in one-step to poly(2,6-dimethyl-1,4-phenylene) ethers having intrinsic viscosity of 0.1 to 0.2 measured at 25° C. in chloroform. When this polymer product is again oxidized or low molecular weight poly(2,6-dimethyl-1,4-polphenylene) ethers prepared by an other process are oxidized in the same system, the polymer is converted to a polymer having an intrinsic viscosity of at least 0.4. This means that the cheap and readily available alkali metal hydroxides may be used in place of the copper salt and amine taught by Hay. Typical of the alkali metal hydroxides are lithium hydroxide, sodium hydrixide, potassium hydroxide, cesium hydroxide, and rubidium hydroxide. Of these alkali metal hydroxides, the most readily available are sodium hydroxide, potassium hydroxide and lithium hydroxide, and are therefore preferred.

The reaction with oxygen proceeds readily at room temperature, but more rapidly as the temperature is increased up to the reflux temperature of the reaction medium. The reaction can be carried out at atmospheric, subatmospheric, or superatmospheric pressure. However, the reaction readily occurs at atmospheric pressure and there is no necessity for using pressures higher or lower than atmospheric.

The general method of carrying out my process is to dissolve the 2,6-dimethyl-1,4-phenylene ether polymer in a liquid solvent which is both a solvent for the starting material as well as the higher molecular weight polymer product. Generally such solvents should be inert under the oxidation conditions of the reaction and nonreactive with the alkali metal hydroxide. Examples of suitable solvents are the liquid aromatic hydrocarbons, for example, benzene, toluene, xylene, cumene, ethyl benzene, etc., the halogenated aliphatic and aromatic hydrocarbons, for example, chloroform, dichloromethane, tetrachloroethane, monochlorobenzene, o-dichlorobenzene, etc. The choice of the particular solvents is merely a matter of convenience and availability. Sufficient solvent should be used to completely dissolve the starting polymer.

Likewise, the solvents for the alkali metal hydroxides should be one which readily dissolves the alkali metal hydroxide and, as a solution containing the alkali metal hydroxide, is immiscible with, and therefore forms emulsions with the solution containing the polymer. Typical of suitable solvents are water and the lower alkanols, e.g., methanol, ethanol, etc. or mixtures thereof. Water is the cheapest and preferred solvent, but mixtures of water and methanol or ethanol give a faster reaction at room temperature. Only enough solvent needs to be used to dissolve the alkali. The solution of the alkali metal hydroxide and the solution of the polymer starting material are emulsified by rapid stirring or shaking. If desired, a surface active agent capable of being used in alkaline solution, may be added to aid in the emulsification of the two phases. However, the use of such a surface active agent is not necessary.

Oxygen or an oxygen containing gas, including air, if the carbon dioxide is removed, is introduced into the reaction vessel. If desired, it can be finely dispersed by use of a sparging tube or fritted glass disk. However, when vigorous stirring or shaking is used, it merely needs to be present in the gas-phase above the reaction mixture in the reactor.

The polymer formed by my reaction is a higher molecular weight poly-(2,6-dimethyl-1,4-phenylene) ether than the starting material, but has the same general structure as proved by infrared analysis of the final and the starting material. It was indeed surprising to find that although 2,6-dimethylphenol which can be considered the monomer of the polymer, cannot be oxidized to polymer by my process, but if a solution of 2,6-dimethylphenol and a low molecular weight polymer, even the dimer polymer, then some of the 2,6-dimethylphenol is polymerized and incorporated into the polymeric product. In this case the product is still the same poly(2,6-dimethyl-1,4-phenylene) ether as is obtained by use of the dimer alone or other low molecular weight polymer.

In order that those skilled in the art may better understand my invention, the following examples are given which are illustrative of the practice of my invention, but are not intended for purposes of limitation. In the examples, all parts are by weight unless stated otherwise.

GENERAL PROCEDURE

The reaction vessel was a closed glass vessel equipped with a high frequency, oscillating stirrer. Oxygen was supplied to the reaction vessel from a gas burette which permitted the amount of oxygen which was consumed to be determined. The reaction vessel was immersed in a constant temperature bath. The specific examples give the solvent for the alkali metal hydroxide and the solvent for the polyphenylene ether. The amount of the latter in all examples was 1.21 grams dissolved in 25 ml. of the stated solvent unless otherwise stated. After the desired time of reaction, the phase containing the polymer was separated from the phase containing the alkali metal hydroxide. The polymer was precipitated by pouring the separated polymer-containing phase into methanol containing a sufficient amount of hydrochloric acid to neutralize any alkali. The polymer was well washed with methanol after it was separated by filtration. The intrinsic viscosity of the polymers was determined at 25° C. using chloroform as the solvent for the polymer.

*Example 1*

Using the general procedure, 4-(2',6'-dimethylphenoxy)-2,6-dimethylphenol, the polymeric dimer of 2,6-dimethylphenol, was reacted with oxygen at a temperature of 30° C. The reactants and yield of polymer are shown in Table I.

TABLE I

| Alkaline Phase | Polymer Solvent | MMoles of O₂ Reacted | Polymer Yield, Percent | Intrinsic Viscosity |
|---|---|---|---|---|
| 0.50 g. KOH in 12 ml. C₂H₅OH and 2 ml. H₂O. | C₆H₆ | 1.4 in 231 minutes | 45 | |
| 0.20 g. NaOH in 1 ml. C₂H₅OH. | C₆H₆ | 3.5 in 81 minutes | 41 | |
| 0.35 LiOH in 5.50 ml. C₂H₅OH and 0.50 ml. H₂O. | C₆H₆ | 4.3 in 363 minutes | 31 | 0.1 |

*Example 2*

This example is similar to Example 1, but the reaction was run at 60° C. The reactants and yield of polymer are shown in Table II.

TABLE II

| Alkali Phase | Polymer Solvent | MMoles of O₂ Reacted | Polymer Yield, Percent | Intrinsic Viscosity |
|---|---|---|---|---|
| 1 g. NaOH in 1 ml. H₂O. | C₆H₆ | 7.2 in 398 minutes | 45 | 0.11 |
| 1 g. KOH in 0.5 ml. H₂O. | C₆H₄Cl₂ | 6.7 in 75 minutes | 73 | 0.17 |
| 1 g. LiOH in 2 ml. H₂O. | C₆H₄Cl₂ | 9.3 in 386 minutes | 63 | 0.16 |

Similar results may be obtained by using cesium hydroxide and rubidium hydroxide in place of the above alkali metal hydroxides.

*Example 3*

All attempts to polymerize 2,6-dimethylphenol by my process results only in the formation of very low yields of a mixture of 3,3',5,5'-tetramethyldiphenoquinone and 2,2',6,6'-tetramethyl-p,p'-diphenol, containing a trace amount of the dimer but no higher polymer. This example illustrates how 2,6-dimethylphenol may be polymerized to a polymer if the polymerization is carried out in the presence of a low molecular weight poly-(2,6-dimethyl-1,4-phenylene) ether. Using the general procedure the alkali phase was 0.5 g. of lithium hydroxide dissolved in 5 ml. of water. The other phase was 0.60 g. of 2,6-dimethylphenol and 0.10 g. of 4-(2',6'-dimethylphenoxy)-2,6-dimethylphenol dissolved in 25 ml. of monochlorobenzene. After 27 hours of reaction at 30° C., 4.8 millimoles of oxygen had reacted. The yield of polymer was 0.148 g. having an intrinsic viscosity of 0.11. Since the maximum amount of this product which could have been formed from the dimer was 0.10 g., the yield of 0.148 g. indicates that at least 32.5% of the yield had come from polymerization of the 2,6-dimethylphenol.

*Example 4*

This example illustrates the use of a surface active agent in the alkali phase to aid the emulsification of the two phases. Using the general procedure, 1.21 g. of 4-(2',6'-dimethylphenoxy)-2,6-dimethylphenol was dissolved in 25 ml. of monochlorobenzene. The alkali phase contained 0.5 g. of sodium hydroxide and 0.1 g. of sodium laurylsulfate dissolved in 2 ml. of water. After a reaction time of 172 minutes at 60° C., 5.5 millimoles of oxygen had reacted. A yield of 74% of polymer having an intrinsic viscosity of 0.14 was obtained.

*Example 5*

This example illustrates how a polyphenylene ether having an intrinsic viscosity less than 0.4 may be polymerized to a polymer having an intrinsic viscosity greater than 0.4. Using the general procedure, 1.21 g. of a poly-(2,6-dimethyl-1,4-phenylene) ether, having a number average molecular weight of 4,900 and an intrinsic viscosity of 0.187, was dissolved in 20 ml. of benzene and mixed with a solution of 0.5 g. of potassium hydroxide dissolved in the minimum amount of water. After 16.5 hours at 30° C., 1.6 millimoles of oxygen had reacted. The yield was 0.9 g. of polymer having an intrinsic viscosity of 0.41.

Those polymers which are produced by my process which have intrinsic viscosities less than 0.4 measured at 25° C. in chloroform solution, may be reoxidized by my process to obtain polymers having intrinsic viscosities greater than 0.4 as illustrated by Example 5. Such high molecular weight products have excellent physical, mechanical, chemical, electrical, and thermal properties that they have many and varied uses. For example, they can be used in molding powder formulations either alone or mixed with various fillers, such as wood flour, diatomaceous earth, carbon black, silica, etc., to make molded parts such as spur, helical, worm, or bevel ears, ratchets, bearings, cams, impact parts, gaskets, valve seats for high pressure oil, and gas systems or other chemical fluids requiring resistance to chemicals, etc. They can be used to prepare molded, calendered, or extruded articles, films, coatings, threads, filaments, tapes, and the like. They can be applied to a broad spectrum of uses in the forms of sheets, rods, tapes, etc., and are useful in electrical applications such as in cable terminals, terminal blocks, backing for electrical circuits, as components of dynamoelectric machines that operate at high temperatures, etc. Films of these materials can be prepared by suitable means such as by dissolving or suspending them in a suitable solvent, followed by spreading on a surface from which the polymer is removed after evaporation of the solvent, by calendering, extrusion, etc. These films (either oriented or not) are useful as metal or fiber liners, containers, covers, closures, electrical insulating tapes, as sound recording tapes, pipe and wire tapes, etc. As a coating material they can be applied to a solution or suspension to any convenient foundation where a surface possessing their excellent properties is desired. They can be used as an encapsulation material for electrical insulation, for example, as a wire enamel, potting compound, etc. They can be extruded from melt, solution or suspension, into a precipitating solvent or evaporating medium, etc. The fibers so produced (oriented or not) can be woven into fabrics useful in many applications, for example, as filter cloth where high chemical and heat resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, and so forth. The polymers may also be mixed with various fillers, modifying agents, etc., such as dyes, pigments, stabilizers, plasticizers, etc.

Obviously, other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of increasing the molecular weight of a poly-(2,6-dimethyl-1,4-phenylene) ether which comprises reacting oxygen with an emulsion of a solution of said polyphenylene ether and a solution of an alkali metal hydroxide.

2. The process of claim 1 wherein the alkali metal hydroxide is selected from the group consisting of lithium hydroxide, sodium hydroxide and potassium hydroxide.

3. The process of claim 1 wherein the solution of the alkali metal hydroxide is an aqueous solution.

4. The process of claim 1 wherein the polyphenylene ether is 4-(2',6'-dimethylphenoxy)-2,6-dimethylphenol.

5. The process of claim 1 wherein the starting polyphenylene ether has an intrinsic viscosity less than 0.4 measured at 25° C. in chloroform.

6. The process of claim 1 wherein the solution of the polyphenylene ether contains 2,6-dimethylphenol.

No references cited.

WILLIAM H. SHORT, *Primary Examiner.*

M. GOLDSTEIN, *Assistant Examiner.*